United States Patent Office 2,806,249
Patented Sept. 17, 1957

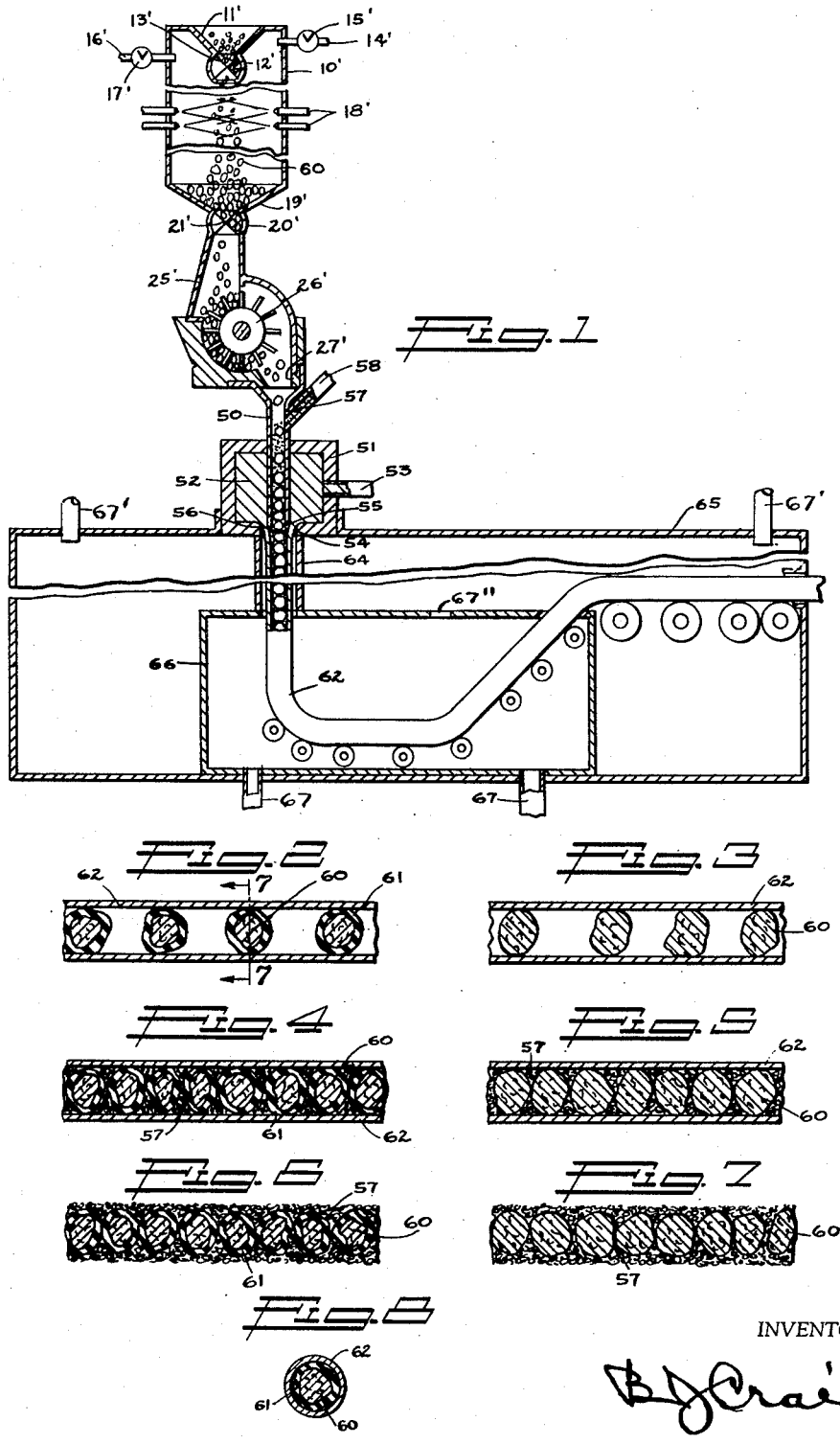

2,806,249

APPARATUS FOR MAKING A COMPOSITION CONTAINING COVERED PARTICLES

Burnie J. Craig, Pasadena, Calif.

Original application June 9, 1944, Serial No. 539,589, now Patent No. 2,631,355, dated March 17, 1953. Divided and this application January 26, 1953, Serial No. 333,264

4 Claims. (Cl. 18—5)

In the manufacture of composition cork the comminuted cork is mixed with a binder and the mixture is fed to a suitable forming machine or die. Care must be taken to insure a thorough mixing and there should be no swelling or distorting of the cork particles or any premature insolubilizing of the binder.

Also, in manufacturing cork compositions, when the binder and cork particles are mixed, there is a tendency for the binder to enter the pores of the cork and remain in the pores and there is also a tendency for the binder to enter the pores during the molding or other treating of the composition in the steps of making the finished product.

It is one of the objects of this invention to provide an apparatus for making a composite preparation which overcomes the difficulties mentioned and which has desirable physical properties.

An additional object of the invention is to provide a novel apparatus for making a porous composition.

A further object of the invention is to provide a novel apparatus for making a composition wherein porous particles, while in an atmosphere of gas above atmospheric pressure, are mixed with a binder, after which the binder is insolubilized.

A further object of the invention is to provide a novel apparatus for making a composition wherein porous particles, while containing gas, are individually or in groups covered with a film which entraps the contained gas.

An additional object of the invention is to provide a novel apparatus for making a composition including cork particles wherein the particles contain entrapped gas which may have a pressure greater than atmospheric pressure.

A further object of the invention is to provide a novel apparatus for making a composition wherein porous particles, while containing a gas under pressure, are mixed with a binder and thereafter the pressure exterior to the composition is reduced to permit the entrapped gas to expand so that it tends to force binder from the pores of the cork particles.

A further object of the invention is to provide a novel apparatus for making a composition wherein porous particles, while containing a gas under pressure, are mixed with a binder and thereafter the pressure exterior to the composition is reduced to less than that of the entrapped gas, thus permitting the entrapped gas to expand and to force binder from the pores of the particles after which the binder is insolubilized.

Another object of the invention is to provide a novel apparatus for making a composition wherein porous particles, while containing gas under pressure above atmospheric, are individually or in groups covered with a film which entraps the contained gas, after which the gas entrapping particles are secured together to form a composition or a thread-like member.

Another object of the invention is to provide a novel apparatus for making a composition wherein porous particles, while containing gas under pressure above atmospheric, are individually or in groups covered with a film which entraps the contained gas, after which the gas entrapping particles are mixed with a binder under pressure conditions which may permit the entrapped gas to expand.

A further object of the invention is to provide a novel apparatus for making a cellular system.

A further object of the invention is to provide a novel apparatus for making a cored composition.

Other objects and advantages of the invention will be apparent from the following description taken in connection with the accompanying drawings, wherein:

Fig. 1 is a central sectional view through an apparatus embodying the features of the invention;

Fig. 2 is a longitudinal, central, sectional view showing the cellular system with the binder omitted;

Fig. 3 is a view similar to Fig. 2, showing material with the binder and the particle covering omitted;

Fig. 4 is a section showing material with the particle covering, outer covering and binder;

Fig. 5 is a sectional view, showing material with the particle covering omitted;

Fig. 6 is a view similar to Fig. 4 with the outer covering omitted;

Fig. 7 is a view similar to Fig. 5 with the outer covering omitted, and

Fig. 8 is a section taken on line 7—7, Fig. 2.

Referring to the drawing by reference characters, an apparatus embodying the features of the invention includes a housing 10', having a funnel shaped container 11' in the top thereof. The container has a cylindrical hopper portion 12' at the bottom thereof in which a rotating hopper gate 13' is mounted. The interior of the housing communicates with a gas pressure conduit 14' and with a constant pressure outlet valve 15' which determines the minimum air pressure within the housing 10'. Also communicating with the interior of the housing 10' I show an outlet 16' with a constant pressure inlet valve 17' therein which determines the maximum pressure within the housing.

Extending into the housing I show a plurality of injection jets 18'. The bottom of the housing is tapered inwardly as at 19' and has a cylindrical hopper portion 20' at the bottom thereof in which a rotating hopper gate 21' is mounted.

In operation, porous particles are placed in the container 11' while gas under pressure is maintained within the housing 10' by means of the conduit 14' and is maintained at a desired pressure by means of the valves 15' and 17'. As the rotating hopper gate 13' is rotated, the small particles of porous material are allowed to fall into the housing and through the path of the sprays where they become coated with covering material. As the particles fall they may be vulcanized or cured so that when the particles reach the bottom portion of the housing they may be removed by means of the rotating hopper gate 21'. Thus it may be seen that compressed gas is entrapped in the pores of the porous particles and sealed therein by the coating of material about each particle.

The members, formed as described, are compressible as well as resilient and elastic due to the contained gas and due to their natural properties.

The porous particles pass from the gate 21' to a discharge spout 25', whence they pass through a distributor 26' which is preferably regulated to run at a proper speed so that the particles are fed evenly. From the distributor 26' the particles pass through a discharge portion 27'. The discharge portion 27' communicates with a tube 50 which extends through a container or housing 51 to which coating material 52 is supplied through a tube 53. The container 51 has an outlet 54 coaxial with, and of larger diameter than, the lower end 55 of the tube 50, which is disposed in the outlet 54 so that a downwardly tapering annular passage 56 is provided through which the material is extruded. Binder material 57 is supplied by a pipe 58 which is shown as communicating with the tube 50 above the container 51.

As the particles 60 advance they are first covered with a coating 61 similar to the coating 23 previously described. The coated, gas entrapping particles pass into the tube 50 where they may be mixed with binder 57. The particles and binder are then discharged from the tube 50 into the tube 62 which is formed by the extruded material 52. The tube 62, with particles therein and with the binder, passes through a tube 64 in a housing 65 into a chamber 66 in the housing where a coagulating bath or evaporative atmosphere may be supplied by pipes 67 to finish the material. From the chamber 66 the material passes to the housing 65 from which it may be carried and packaged for shipment.

When an evaporative atmosphere is employed in the chamber 66 this may be supplied by pipes 67 or pipes 67' since the housing 65 and chamber 66 communicate through an opening 67''. When a bath is provided in the chamber 66 the bath material may be supplied by pipes 67 and a gas under pressure by the pipes 67'. The pressure in the housing 65 and chamber 66 may be greater than, the same as, or less than, the pressure of the gas entrapped within the particles. If the pressure is greater it will tend to cause the tube 62 to more tightly engage the particles prior to the curing of the tube so that the particles will be clamped by the tube. If the pressure is less than that of the entrapped air in the particles, the particles and tube will tend to expand prior to finishing the tube so that a more buoyant cellar system will be provided.

The material shown in Fig. 4 will be produced by operating the machine with all of the material supplied thereto. When the binder is omitted, material such as shown in Fig. 2 is produced and when both binder and particle covering are omitted, material shown in Fig. 3 results. When the particle covering only is omitted, the material shown in Fig. 5 results, while, when the outer covering is omitted, the material shown in Fig. 6 results. When the particle covering and outer covering are omitted, material of the character shown in Fig. 7 will be produced.

The porous particles may consist of comminuted cork, sponge rubber, wood pitch or natural sponge.

The entrapped gas may be air, nitrogen, hydrogen, oxygen or carbon dioxide.

The covering material may be regenerated cellulose formed from viscose, lowly etherified or esterified cellulose derivatives, soluble in aqueous alkaline solution such as lowly etherified methyl, ethyl or glycol cellulose, and lowly esterified cellulose acetate, highly esterified cellulose derivatives soluble in organic solvents such as cellulose acetate, cellulose propionate, cellulose acetate-propionate, methyl, ethyl, ethyl or benzyl cellulose, colloidal dispersions of proteins such as casein, gelatin and the like. Other material such as artificial resins of various kinds may be used.

The covering material might also be natural rubber or a synthetic of the butadiene co-polymer type such as Buna-S rubber, a synthetic of the chloroprene polymer type, such as neoprene, a synthetic of the isobutylene polymer type having small quantities of other diolifines such as isoprene or butadiene, such as Butyl rubber or a plasticized vinyl chloride polymer, such as Koroseal. The natural or artificial rubber may be employed in latex form with the latices applied to the particles in sufficient quantities to provide the necessary thickness.

The binder and/or the material which secures the particles to the core may be a thermo setting type such as urea, phenolic or alkyd resinous materials or albumens or proteins treated with a material to insolubilize them upon heating, or other types of binders may be employed as, for example, raw natural rubber which may be vulcanized for the binding effect; also latices may be employed as binders and regenerated cellulose formed from viscose may be employed.

The covering material with the contained particles may be extruded into a coagulating bath or into an evaporating atmosphere so that the material will have the desired physical characteristics.

This application is a division of application Ser. No. 539,589, filed June 9, 1944, now Patent No. 2,631,355 granted March 17, 1953.

Having thus described the invention, I claim:

1. An apparatus for making a columnar member comprising means to apply independent coverings to porous particles, means to advance and to simultaneously bind the independent covered particles in the form of a continuous column, means to extrude a tubular raw covering about the continuous column of covered particles, and means to apply a finishing agent to the tubular raw covering.

2. An apparatus for making a tubular member which includes covered porous particles, said apparatus including means to cover porous particles, a tube adapted to receive and align the covered porous particles, means to introduce a binder for the aligned covered particles into the tube as the particles pass therethrough, a container having an extruding outlet about the tube, means to supply raw material to the container under pressure whereby it is extruded about the particles and binder passing through the tube, a chamber receiving the extruded material and means to supply finishing material to the chamber.

3. An apparatus for making a tubular member comprising means to cause porous particles to move and to be separated, means to apply a cover to each particle while it is moving and separated from the other particles, means to form the covered particles into a column, means to introduce a binder into the particles in the column, means to provide an extruding outlet about the column forming means, and means to extrude a tubular layer of material through the outlet and about the column of particles at the location of extrusion.

4. In an apparatus for producing tubing of predetermined desired characteristics, means to continuously extrude a raw material in the form of a seamless tubing, means to support the tubing for continuous withdrawal from the point of extrusion, means to direct a column of porous compressed compressible particles into a section of the tubing extending adjacent to the point of extrusion, the degree of particle compression being such as to expand the tubing while in the raw to a predetermined desired degree at a point beyond the point of extrusion, means to pass the tubing while in the raw formative state through a finishing pressure controlled medium in the vicinity of the point of extrusion to finish the tubing to an extent that when the tubing has been expanded by said compressible members to the said predetermined degree it will be in set condition, the degree of expansion of the compressible members and the degree of gaseous pressure about the tubing during finishing of the tubing all being correlated in accordance with predetermined desired physical characteristics of the tubing.

References Cited in the file of this patent

UNITED STATES PATENTS

| 1,184,354 | Knox | May 23, 1916 |
| 1,196,648 | Bleecker | Aug. 29, 1916 |
| 1,649,892 | Daniels | Nov. 22, 1927 |
| 1,650,687 | Bond | Nov. 29, 1927 |
| 1,681,566 | Anderegg | Aug. 21, 1928 |
| 1,758,946 | Grupe | May 20, 1930 |
| 1,854,100 | Brito | Apr. 12, 1932 |
| 1,978,163 | Megow | Oct. 23, 1934 |
| 2,216,832 | Royle | Oct. 8, 1940 |
| 2,317,331 | Mearig | Apr. 20, 1943 |
| 2,561,392 | Marshall | July 24, 1951 |